(12) United States Patent
Schwab

(10) Patent No.: US 6,860,520 B2
(45) Date of Patent: Mar. 1, 2005

(54) HOSE COUPLING ASSEMBLY

(75) Inventor: Christopher L. Schwab, Toledo, OH (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/696,792

(22) Filed: Oct. 30, 2003

(65) Prior Publication Data

US 2004/0145181 A1 Jul. 29, 2004

Related U.S. Application Data

(60) Provisional application No. 60/422,831, filed on Oct. 31, 2002.

(51) Int. Cl.$^7$ .............................................. F16L 39/02
(52) U.S. Cl. ..................... 285/249; 285/242; 285/222.1
(58) Field of Search ................................ 285/249, 242, 285/248, 247

(56) References Cited

U.S. PATENT DOCUMENTS

| | | | | |
|---|---|---|---|---|
| 2,120,275 A | * | 6/1938 | Cowles ..................... | 285/222.4 |
| 2,226,039 A | * | 12/1940 | Wiltse ........................ | 285/231 |
| 2,797,111 A | * | 6/1957 | Beazley ................... | 285/222.4 |
| 2,833,567 A | * | 5/1958 | Bacher et al. ................ | 285/95 |
| 2,848,254 A | * | 8/1958 | Millar ..................... | 285/222.5 |
| 2,853,319 A | * | 9/1958 | Press .......................... | 285/39 |
| 2,991,093 A | * | 7/1961 | Guarnaschelli ............. | 285/110 |
| 3,083,989 A | * | 4/1963 | Press .......................... | 285/110 |
| 3,118,691 A | * | 1/1964 | Press ........................ | 285/222.1 |
| 3,140,106 A | * | 7/1964 | Thomas ................... | 285/222.4 |
| 3,675,951 A | * | 7/1972 | Morin ......................... | 285/39 |
| 4,008,911 A | * | 2/1977 | Kiyooka et al. ............ | 285/249 |
| 4,109,943 A | * | 8/1978 | Cooke ...................... | 285/222.5 |
| 4,303,263 A | * | 12/1981 | Legris ....................... | 285/249 |
| 4,627,644 A | * | 12/1986 | Ekman ......................... | 285/3 |
| 4,805,942 A | * | 2/1989 | Goodridge ............... | 285/222.1 |
| 4,875,720 A | * | 10/1989 | Sasa et al. .................. | 285/249 |
| 6,502,866 B1 | * | 1/2003 | Hujisawa et al. .......... | 285/249 |

FOREIGN PATENT DOCUMENTS

GB 2071799 * 9/1981 ................. 285/249

* cited by examiner

*Primary Examiner*—Eric K. Nicholson
(74) *Attorney, Agent, or Firm*—Honigman Miller Schwartz and Cohn LLP

(57) ABSTRACT

A hose assembly is disclosed that includes a hose tube and a nipple assembly. In an embodiment of the invention, the nipple assembly includes a nipple fastener and a nipple extending from an end. A socket covers the nipple and includes a socket fastener mated with the nipple fastener for drawing the socket towards the nipple assembly. A sleeve is interposed between the covering layer and the tube and is interposed between the socket and the nipple. The sleeve includes at least one barb formed on a surface contacting the tube and a cavity formed to adjoin an end of the tube. An annular sealing member is positioned in the cavity to contact the nipple, at least one surface of the cavity, and the tube. The sleeve causes the tube to be compressed between the sleeve and the nipple, thereby sealing the hose against the nipple assembly.

12 Claims, 3 Drawing Sheets

HOSE COUPLING ASSEMBLY

CROSS-REFERENCE TO RELATED APPLICATIONS

This application claims priority to U.S. provisional application 60/422,831 filed on Oct. 31, 2002, which is incorporated herein by reference in its entirety.

BACKGROUND OF THE INVENTION

The present invention relates to a fluid conveying hose coupling assembly and, more specifically, to a fluid conveying hose coupling assembly for use in high performance fluid systems, such as an air conditioning system, where an end fitting provides a fluidic seal to the hose and a connecting device to another systems.

Fluid conveying hose coupling assemblies are well known in the art for transferring a fluid between two or more systems that cannot be linked by a rigid conduit. Due to an increasing demand for higher performance fluid systems, it is becoming increasingly difficult for traditional hose coupling assemblies to satisfactorily operate without leakage, particularly in high pressure fluid systems and/or fluid systems that include a fluid that is notoriously difficult to contain, such as a refrigerant. Accordingly, there continues to be a need for improved hose coupling assemblies that can operate in high performance fluid systems without leakage or failure.

BRIEF SUMMARY OF THE INVENTION

A hose assembly is disclosed that includes a hose tube and a nipple assembly. In an embodiment of the invention, the nipple assembly includes a nipple fastener formed proximate one end of the nipple assembly with a nipple extending from the end. The nipple fastener has at least a first thread formed thereon. A socket covers the nipple and includes at least a second thread mating with the external thread of the nipple fastener for drawing the socket towards the nipple assembly. A sleeve is interposed between the covering layer and the tube and is interposed between the socket and the nipple. The sleeve includes at least one barb formed on a surface contacting the tube and a cavity formed to adjoin an end of the tube. An annular sealing member is positioned in the cavity to contact the nipple, at least one surface of the cavity, and the tube. When the socket is rotated relative to the nipple fastener and drawn toward the nipple assembly, the sleeve causes the tube to be compressed between the sleeve and the nipple, thereby sealing the hose against the nipple assembly.

BRIEF DESCRIPTION OF THE DRAWINGS

Embodiments of the invention will now be described, by way of example, with reference to the accompanying drawings, wherein.

DETAILED DESCRIPTION OF THE INVENTION

Figure 1:
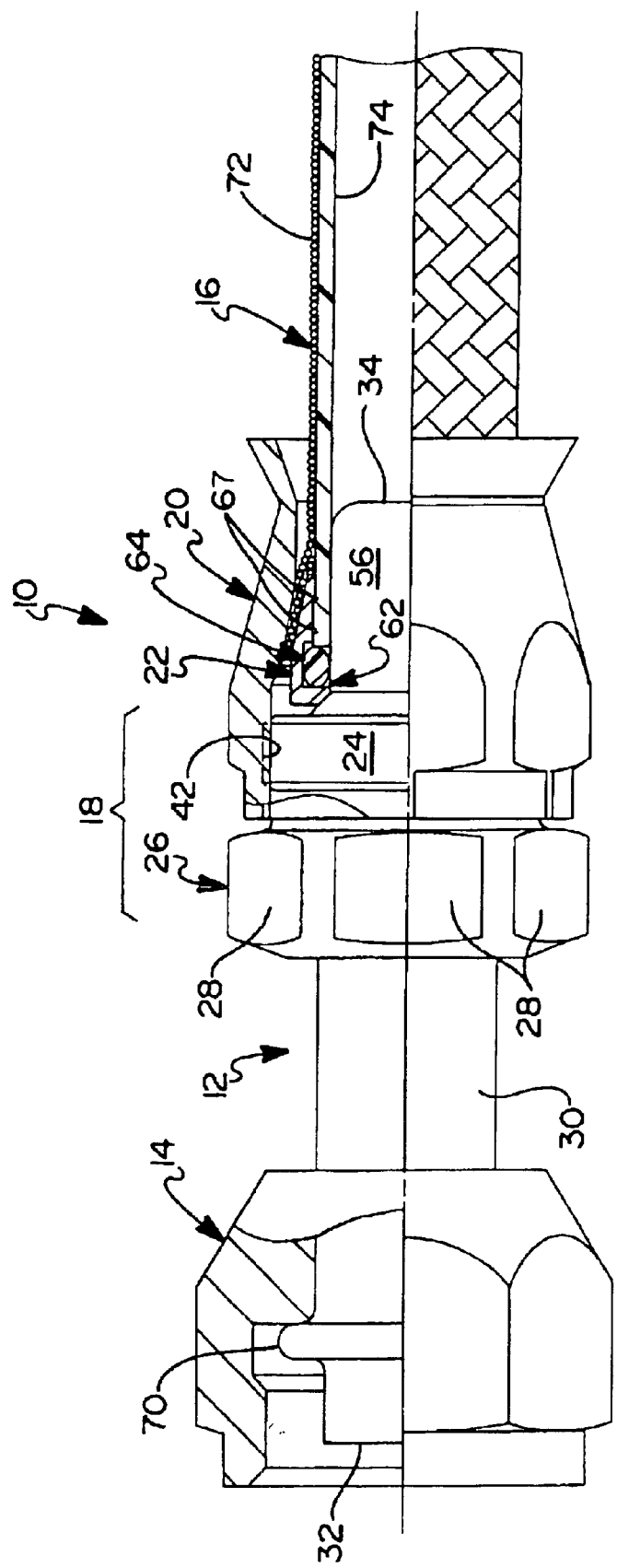
FIG. 1 is a is a partial cross-sectional view of a hose coupling assembly according to an embodiment of the present invention.

Referring to FIG. 1 of the drawings, a partial cross-sectional view of a hose assembly 10 of the present invention is shown. In an embodiment, hose assembly 10 includes a nipple assembly 12, a fitting 14 and a hose 16. Hose 16 is secured and sealed to nipple assembly 12, which is then connected to another fluid system using fitting 14.

Figure 2:
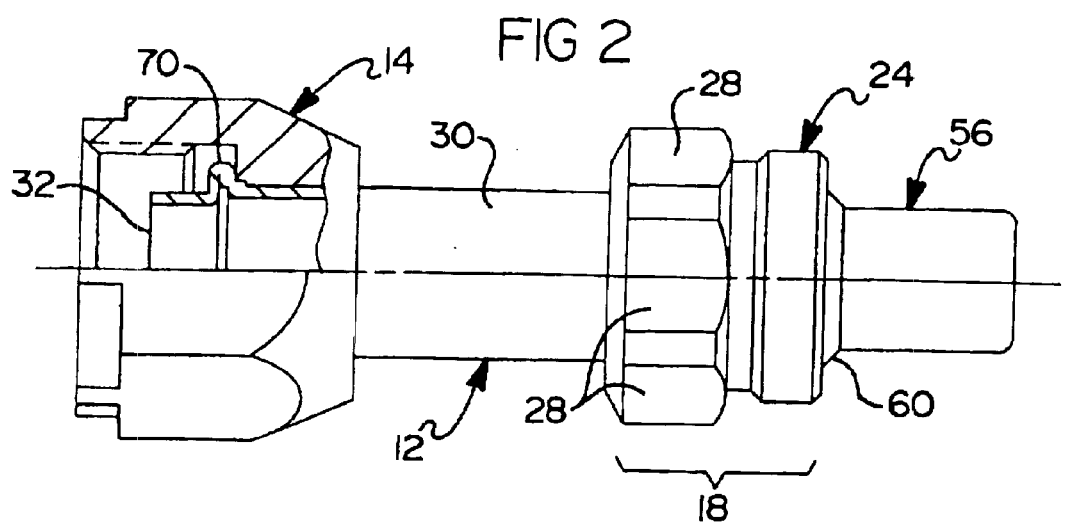
FIG. 2 is a partial cross-sectional view of a nipple assembly according to an embodiment of the present invention.

In the embodiment of the invention shown in FIGS. 1 and 2, nipple assembly 12 includes a nipple fastener 18, a socket 20 removably secured to nipple fastener 18 and a sleeve 22. In a particular configuration, nipple fastener 18 includes at least one external thread 24 and a first tool engaging feature 26, such as a number of flats 28, for accommodating use of a tool, such as a wrench, to assemble nipple fastener 18 with socket 20. Nipple fastener 18 is positioned over a tubular member 30 that extends from a first end 32 to a second end 34. In an embodiment, nipple fastener 18 is secured to tubular member 30, such as by brazing or welding nipple fastener 18 to tubular member 30. In another embodiment, nipple fastener 18 may be formed with tubular member 30, such as by machining nipple fastener 18 and tubular member 30 from a blank of material. An axial cavity (not shown) extends through tubular member 30 to allow fluid to pass through nipple assembly 12.

Figure 3:
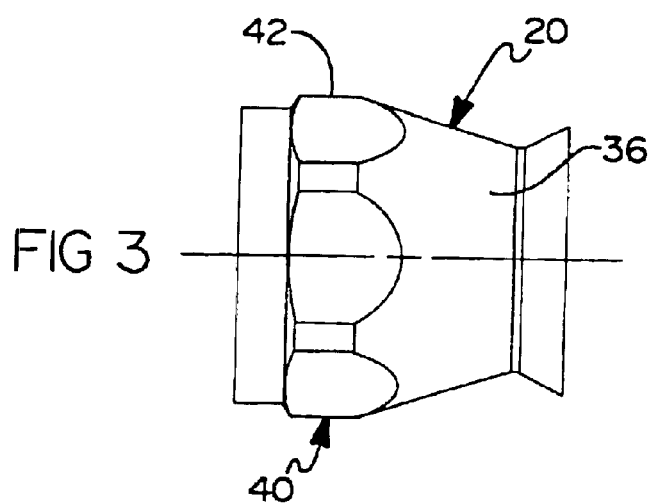
FIG. 3 is an elevation view of a socket according to an embodiment of the present invention.
Figure 4:
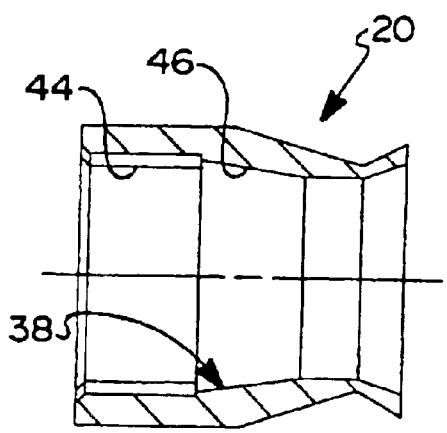
FIG. 4 is a cross-sectional view of the socket of FIG. 3.

With reference to FIGS. 3 and 4, an embodiment of socket 20 is shown. In the illustrated embodiment, socket 20 is generally cylindrical having an outer surface 36 and an inner surface 38. Outer surface 36 may include a second tool engaging feature 40, such as a number of flats 42, for accommodating use of a tool to secure socket 20 to nipple fastener 18. In the configuration shown in FIG. 4, inner surface 38 includes at least one internal thread 44 for mating with external thread 24 on nipple fastener 18 and a generally conical surface portion 46.

Figure 5:
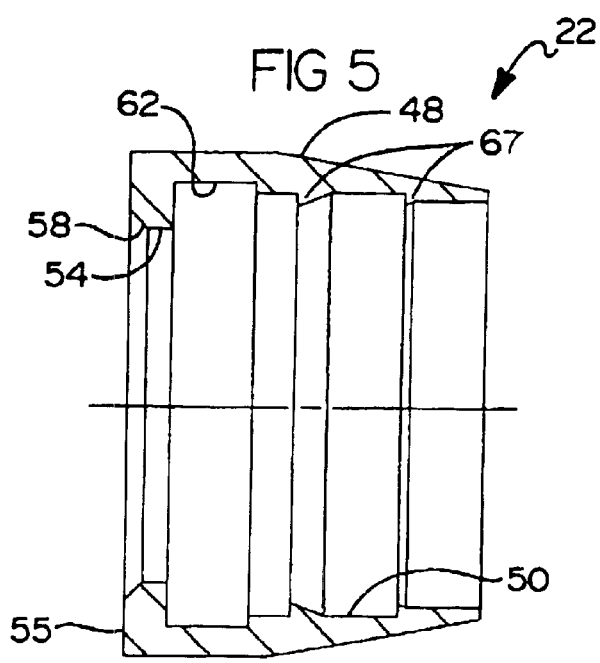
FIG. 5 is a cross-sectional view of a sleeve according to an embodiment of the present invention.

Referring to FIG. 5, an embodiment of sleeve 22 is shown. In the illustrated embodiment, sleeve 22 is a generally cylindrical member having an outer surface 48 and an inner surface 50. An opening 54 is provided in a forward end 55 of sleeve 22 that is slightly larger in diameter than a nipple portion 56 of tubular member 30. Opening 54 may include a chamfer 58 that extends radially inwardly and away from forward end 55. When so equipped, chamfer 58 may engage a corresponding tapered shoulder 60 on nipple assembly 12 that extends radially outwardly and away from nipple portion 56 toward nipple fastener 18 (see, e.g., FIG. 2).

Figure 6:
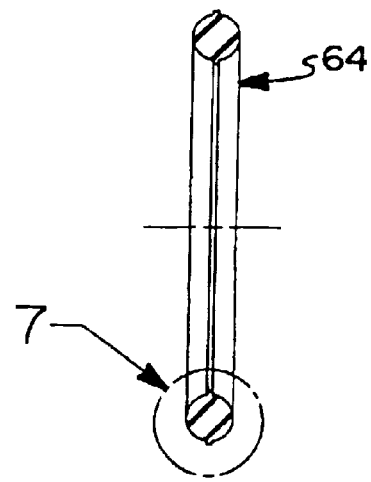
FIG. 6 is a cross-sectional view of an O'ring according to an embodiment of the present invention.
Figure 7:
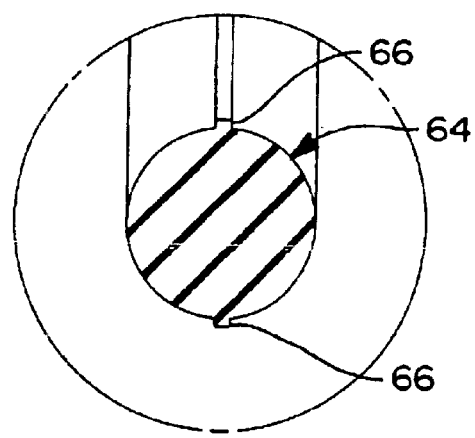
FIG. 7 is a detail view of the O'ring cross-section shown in FIG. 6.

In the embodiment shown in FIG. 5, inner surface 50 includes a radially outwardly extending cavity 62 for receiving an annular sealing member 64, such as an O-ring (see, e.g., FIGS. 1 and 6). The inner surfaces of cavity 62 are configured to contact and position annular sealing member 64 as hose 16 is secured to nipple assembly 12. When so equipped, annular sealing member 64 is positioned in cavity 62 to contact nipple portion 56 and hose 16, thereby effectuating a seal between sleeve 22, hose 16 and nipple portion 56. In this manner, annular sealing member 64 is trapped between sleeve 22, hose 16 and nipple portion 56 after assembly of the components. In FIGS. 6 and 7, a cross-sectional view of an exemplary annular sealing member 64 is shown. More detail of an end cross-section is shown in FIG. 7, where small circumferential rings 66 may be formed on the outer and inner surface of annular sealing member 64.

When so configured, rings 66 increase the sealing capabilities of annular sealing member 64, particularly in high pressure applications of the invention.

With reference again to FIG. 5, inner surface 50 of sleeve 22 may also include at least one barb 67, which is positioned to contact and deform a portion of hose 16 when socket 20 is assembled onto nipple fastener 18. In the illustrated embodiment, barbs 67 are shown as circumferential in shape; however, other shapes and configurations known in the art may be utilized to yield a similar result.

In the embodiment illustrated in FIG. 1, hose 16 is a fluid conveying reinforced flexible tube. In a particular implementation, hose 16 includes a flexible tube 74, such as Nylon or PTFE tubing, and a covering layer 72, such as braided stainless steel or some other appropriate protective type material such as Kevlar®. It will be appreciated, however, that hose 16 may include any fluid conveying conduit having a reinforced flexible tube, particularly, those designs in which the covering layer may be separated from the flexible tube.

Fitting 14 is used to attach hose assembly 10 to an inlet port, outlet port or any connector from another system, such as an air conditioning compressor. In the illustrated embodiment, fitting 14 is rotatable relative to tubular portion 30 of nipple assembly 12 and is internally threaded for secured engagement to the mating system connector. To facilitate connection of hose assembly 10 to another system, tubular portion 30 may include one or more features, such as a bump 70, as is known in the art. The particular fitting configuration illustrated in FIG. 1 is not intended to limit the scope of the present invention present and it is recognized that other fitting configurations known in the art may be employed to secure nipple assembly 12 to the mating system connector.

A method for constructing hose assembly 10, according to an embodiment of the invention, will now be described with reference to FIG. 1. As a preliminary matter, hose 16 is cut to the desired length, if required, and socket 20 is slid over the end of hose 16. With socket 20 pushed away from the end of hose 16, tube 74 and covering layer 72 may then be separated just enough for sleeve 22 to slide under covering layer 72 between covering layer 72 and tube 74. In the illustrated embodiment, tube 74 performs the sealing part of the connection, while covering layer 72 provides the strength required to keep nipple assembly 12 from blowing off hose 16 due to internal hose pressure.

Hose 16 and sleeve 22 are then pushed onto nipple portion 56 of nipple assembly 12. Depending on the component dimensions and the material properties of tube 74 and nipple portion 56, chamfer 58 may or may not initially engage tapered shoulder 60 on nipple assembly 12. Once hose 16 is pushed onto nipple portion 56, socket 20 may then be pushed forward and secured to nipple fastener 18. In the illustrated embodiment, socket 20 is secured to nipple fastener 18 by engagement of internal threads 42, formed on the inner surface 38 of the socket 20, with external threads 24 formed on nipple fastener 18. Turning the socket 20 relative to nipple fastener 18 causes socket 20 to be drawn towards nipple fastener 18 causing covering layer 72 to be compressed between sleeve 22 and conical surface portion 46 of socket 20. Concurrently, barbs 67 are forced into the surface of tube 74, thereby securing hose 16 to nipple assembly 12. Additionally, annular sealing member 64 is positioned in cavity 62 to contact nipple portion 56 and hose 16, thereby effectuating a seal between sleeve 22, hose 16 and nipple portion 56.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A hose assembly comprising:
   a hose having a covering layer applied over a tube;
   a nipple assembly having a nipple fastener formed proximate one end with a nipple extending from the end, the nipple fastener having at least a first thread formed thereon;
   a socket covering the nipple and having at least a second thread mating with the external thread of the nipple fastener for drawing the socket towards the nipple assembly;
   a sleeve interposed between the covering layer and the tube and interposed between the socket and the nipple, the sleeve having at least one barb formed on a surface contacting the tube and having a cavity formed to adjoin an end of the tube;
   an annular sealing member positioned in the cavity to contact the nipple, at least one surface of the cavity, and the tube; and
   whereby upon rotating the socket relative to the nipple assembly, the sleeve causes the tube to be compressed between the sleeve and the nipple thereby sealing the hose against the nipple assembly.

2. The hose assembly of claim 1, where the annular sealing member is positioned to contact the end of the tube.

3. The hose assembly of claim 1, wherein the annular sealing member includes at least one circumferential ring.

4. A hose coupling assembly comprising:
   a nipple assembly having a nipple fastener formed at one end with a nipple extending from the end, the nipple fastener having at least a first thread formed thereon;
   a socket covering the nipple and having at least a second thread mating with the external thread of the nipple fastener for drawing the socket towards the nipple assembly;
   a sleeve interposed between the socket and the nipple, the sleeve including at least one barb for engaging a hose tube and at least partially defining a cavity formed to adjoin an end of the hose tube;
   an annular sealing member positioned in the cavity to contact the nipple, at least one surface of the cavity, and the hose tube; and
   whereby upon rotating the socket relative to the nipple assembly, the sleeve causes the hose tube to be compressed between the sleeve and the nipple thereby sealing the hose tube against the nipple assembly.

5. The hose coupling assembly of claim 4, where the annular sealing member is positioned to contact the end of the tube.

6. The hose coupling assembly of claim 4, wherein the annular sealing member includes at least one circumferential ring.

7. A hose assembly comprising:

a hose having a covering layer applied over a tube;

a nipple assembly having a nipple fastener formed proximate one end with a nipple extending from the end;

a socket covering the nipple and having a socket fastener mated with the nipple fastener for drawing the socket towards the nipple assembly;

a sleeve interposed between the covering layer and the tube and interposed between the socket and the nipple, the sleeve configured to engage the tube and at least partially defining a cavity formed to adjoin an end of the tube;

an annular sealing member positioned in the cavity to contact the nipple, at least one surface of the cavity, and the tube; and whereby upon movement of the socket relative to the nipple assembly, the socket causes the covering layer to be compressed between the socket and the sleeve and the sleeve causes the tube to be compressed between the sleeve and the nipple thereby connecting and sealing the hose to nipple assembly.

8. The hose assembly of claim 7, where the annular sealing member is positioned to contact the end of the tube.

9. The hose assembly of claim 7, wherein the annular sealing member includes at least one circumferential ring.

10. A hose coupling assembly comprising:

a nipple assembly having a nipple fastener formed at one end with a nipple extending from the end;

a socket covering the nipple and having a socket fastener mated with the nipple fastener for drawing the socket towards the nipple assembly;

a sleeve adapted to be interposed between a hose covering layer and a hose tube and interposed between the socket and the nipple, the sleeve configured to engage the tube and at least partially defining a cavity formed to adjoin an end of the tube;

an annular sealing member positioned in the cavity to contact the nipple, at least one surface of the cavity, and the tube; and whereby upon movement of the socket relative to the nipple assembly, the socket causes the covering layer to be compressed between the socket and the sleeve and the sleeve causes the tube to be compressed between the sleeve and the nipple thereby connecting and sealing the hose to nipple assembly.

11. The hose assembly of claim 10, where the annular sealing member is positioned to contact the end of the tube.

12. The hose assembly of claim 10, wherein the annular sealing member includes at least one circumferential ring.

* * * * *